(12) United States Patent
Ofer et al.

(10) Patent No.: US 7,497,968 B2
(45) Date of Patent: Mar. 3, 2009

(54) DILUTE SOLUTIONS OF LYOTROPIC LIQUID CRYSTALLINE POLYMERS, METHODS OF MAKING SAME AND COMPOSITIONS PREPARED FROM SAME

(75) Inventors: David Ofer, Needham, MA (US); Bindu R. Nair, Framingham, MA (US); John D. Larouco, Milford, MA (US); William A. Stevenson, Concord, MA (US); Leslie S. Rubin, Newton, MA (US)

(73) Assignee: Foster-Miller, Inc., Waltham, MA (US)

( * ) Notice: Subject to any disclaimer, the term of this patent is extended or adjusted under 35 U.S.C. 154(b) by 416 days.

(21) Appl. No.: 11/134,583

(22) Filed: May 20, 2005

(65) Prior Publication Data

US 2006/0065877 A1 Mar. 30, 2006

Related U.S. Application Data

(60) Provisional application No. 60/573,152, filed on May 22, 2004.

(51) Int. Cl.
*C09K 19/52* (2006.01)
*C09K 19/54* (2006.01)
*C08J 3/20* (2006.01)
*H01M 8/00* (2006.01)

(52) U.S. Cl. .............. 252/299.01; 252/62.2; 252/299.5; 428/1.1; 428/308.4; 428/910; 429/30; 429/33; 429/188; 521/27

(58) Field of Classification Search ............ 252/299.01, 252/299.5, 62.2; 428/1.1, 1.5, 308.4, 910; 429/33, 30, 188; 521/27
See application file for complete search history.

(56) References Cited

U.S. PATENT DOCUMENTS

| | | | | |
|---|---|---|---|---|
| 5,328,654 A | * | 7/1994 | Dixit | ........................ 264/289.3 |
| 6,228,922 B1 | * | 5/2001 | Wang et al. | .................. 524/413 |
| 2006/0004112 A1 | * | 1/2006 | Shimoyama et al. | .......... 521/27 |

* cited by examiner

*Primary Examiner*—Shean C Wu
(74) *Attorney, Agent, or Firm*—Edwards Angell Palmer & Dodge LLP; David G. Conlin; Lisa Swiszcz Hazzard

(57) ABSTRACT

The invention features dilute solutions of rigid rod or extended rod lyotropic liquid crystalline polymers prepared from high concentration polymerization mixtures. The invention also features methods of preparing such dilute solutions which utilize high mechanical shear to induce mix the high concentration solution with a diluent. The invention further provides articles of manufacture, including films and fibers, having a porous microstructure which are prepared from the dilute homogeneous solutions of the invention.

36 Claims, 1 Drawing Sheet

DILUTE SOLUTIONS OF LYOTROPIC LIQUID CRYSTALLINE POLYMERS, METHODS OF MAKING SAME AND COMPOSITIONS PREPARED FROM SAME

CROSS-REFERENCE TO RELATED APPLICATION(S)

This application claims priority from U.S. Provisional Application Ser. No. 60/573,152 filed May 22, 2004 which is herein incorporated by reference.

This invention was made with government support under F33615-01-C-2112 from the United States Air Force. The government has certain rights in the invention.

FIELD OF INVENTION

The present invention relates to dilute homogeneous solutions of rigid rod or extended rod lyotropic liquid crystalline polymer in a solvent. The present invention further provides methods for the preparation of dilute homogeneous solutions of rigid rod or extended rod lyotropic liquid crystalline polymer, and particularly to methods of diluting high concentration dope solutions. The invention also relates to articles composed of rigid rod or extended rod lyotropic liquid crystalline polymer having a microporous structure which are prepared by coagulation of the dilute homogeneous solutions provided by the instant invention.

BACKGROUND OF THE INVENTION

There is a considerable need in both the military and commercial sectors for quiet, efficient and lightweight power sources that have improved power density. Military applications include, but are not limited to, submersibles, surface ships, portable/mobile field generating units, and low power units (i.e., battery replacements). For example, the military has a strong interest in developing low range power sources (a few watts to a few kilowatts) that can function as replacements for batteries. Commercial applications include transportation (i.e., automotive, bus, truck and railway), communications, on-site cogeneration and stationary power generation.

Other interest exists for household applications, such as radios, camcorders and laptop computers. Additional interest exists in larger power sources or sources of higher power density that can be used in operating clean, efficient vehicles. In general, there is a need for quiet, efficient and lightweight power sources anywhere stationary power generation is needed.

Additionally, the use of gasoline-powered internal combustion engines has created several environmental, exhaust gas-related problems. One possible solution to these environmental problems is the use of fuel cells. Fuel cells are highly efficient electrochemical energy conversion devices that directly convert the chemical energy derived from renewable fuel into electrical energy.

Significant research and development activity has focused on the development of proton-exchange membrane fuel cells. Proton-exchange membrane fuel cells have a polymer electrolyte membrane disposed between a positive electrode (cathode) and a negative electrode (anode). The polymer electrolyte membrane is composed of an ion-exchange polymer (i.e., ionomer). Its role is to provide a means for ionic transport and prevent mixing of the molecular forms of the fuel and the oxidant.

Solid polymer electrolyte fuel cells (SPEFCs) are an ideal source of quiet, efficient, and lightweight power. While batteries have reactants contained within their structure which eventually are used up, fuel cells use air and hydrogen to operate continuously. Their fuel efficiency is high (45 to 50 percent), they do not produce noise, operate over a wide power range (10 watts to several hundred kilowatts), and are relatively simple to design, manufacture and operate. Further, SPEFCs currently have the highest power density of all fuel cell types. In addition, SPEFCs do not produce any environmentally hazardous emissions such as $NO_x$ and $SO_x$ (typical combustion by-products).

The traditional SPEFC contains a solid polymer ion-exchange membrane that lies between two gas diffusion electrodes, an anode and a cathode, each commonly containing a metal catalyst supported by an electrically conductive material. The gas diffusion electrodes are exposed to the respective reactant gases, the reductant gas and the oxidant gas. An electrochemical reaction occurs at each of the two junctions (three phase boundaries) where one of the electrodes, electrolyte polymer membrane and reactant gas interface.

Despite their potential for many applications, SPEFCs have not yet been commercialized due to unresolved technical problems and high overall cost. One major deficiency impacting the commercialization of the SPEFC is the inherent limitations of today's leading membrane and electrode assemblies. To make the SPEFC commercially viable (especially in automotive applications), the membranes employed must operate at elevated/high temperatures (>120° C.) so as to provide increased power density, and limit catalyst sensitivity to fuel impurities. This would also allow for applications such as on-site cogeneration (high quality waste heat in addition to electrical power). Current membranes also allow excessive methanol crossover in liquid feed direct methanol fuel cells (dependent on actual operating conditions, but is typically equivalent to a current density loss of about 50 to 200 $mA/cm^2$ @ 0.5V). This crossover results in poor fuel efficiency as well as limited performance levels.

Several polymer electrolyte membranes have been developed over the years for application as solid polymer electrolytes in fuel cells. However, these membranes have significant limitations when applied to liquid-feed direct methanol fuel cells and to hydrogen fuel cells. The membranes in today's most advanced SPEFCs do not possess the required combination of ionic conductivity, mechanical strength, dehydration resistance, chemical stability and fuel impermeability (e.g., methanol crossover) to operate at elevated temperatures.

DuPont developed a series of perfluorinated sulfonic acid membranes known as Nafion® membranes. The Nafion® membrane technology is well known in the art and is described in U.S. Pat. Nos. 3,282,875 and 4,330,654. Unreinforced Nafion® membranes are used almost exclusively as the ion exchange membrane in present SPEFC applications. This membrane is fabricated from a copolymer of tetrafluoroethylene (TFE) and a perfluorovinyl ethersulfonyl fluoride. The vinyl ether comonomer is copolymerized with TFE to form a melt-processable polymer. Once in the desired shape, the sulfonyl fluoride group is hydrolyzed into the ionic sulfonate form.

There are several mechanisms that limit the performance of Nafion® membranes in fuel cell environments at temperatures above 100° C. In fact, these phenomenon may begin at temperatures above even 80° C. Mechanisms include membrane dehydration, reduction of ionic conductivity, radical formation in the membrane (which can destroy the solid polymer electrolyte membrane chemically), loss of mechanical strength via softening, and increased parasitic losses through high fuel permeation.

The Nafion® membrane/electrode is also very expensive to produce, and as a result it is not (yet) commercially viable. Reducing membrane cost is crucial to the commercialization of SPEFCs. It is estimated that membrane cost must be reduced by at least an order of magnitude from the Nafion® model for SPEFCs to become commercially attractive.

In an effort to reduce costs and move toward potential commercialization of SPEFCs, ion-exchange membranes that are less expensive to produce also have been investigated for use in polymer electrolyte membrane fuel cells.

Sulfonated poly(aryl ether ketones) developed by Hoechst AG are described in European Patent No. 574,891,A2. These polymers can be crosslinked by primary and secondary amines. However, when used as membranes and tested in polymer electrolyte membrane fuel cells, only modest cell performance is observed.

Sulfonated polyaromatic based systems, such as those described in U.S. Pat. Nos. 3,528,858 and 3,226,361, also have been investigated as membrane materials for SPEFCs. However, these materials suffer from poor chemical resistance and mechanical properties that limit their use in SPEFC applications.

Solid polymer membranes comprising a sulfonated poly (2,6 dimethyl 1,4 phenylene oxide) alone or blended with poly(vinylidene fluoride) also have been investigated. These membranes are disclosed in WO 97/24777. However, these membranes are known to be especially vulnerable to degradation from peroxide radicals.

The inherent problems and limitations of using solid polymer electrolyte membranes in electrochemical applications, such as fuel cells, at elevated/high temperatures (>100° C.) have not been solved by the polymer electrolyte membranes known in the art. Specifically, maintaining high ion conductivity and high mechanical strength, resisting dehydration and other forms of degradation remain problematic, especially at elevated operating temperatures. As a result, commercialization of SPEFCs has not been realized.

Composite polymer membranes having an ion conducting material dispersed in a microporous substrate polymer have been the subject of substantial research. Several membranes are disclosed in, U.S. Pat. No. 6,248,469 in which an ion conducting membrane is incorporated into pores of a microporous membrane composed of a rigid rod or extended rod lyotropic liquid crystalline polymer. Microporous membranes were traditionally prepared from as-polymerized dope solutions in part because the no methods had previously been disclosed to prepare lower concentration dope solutions of high molecular weight lyotropic liquid crystalline polymers by either lower concentration polymerization or by dilution of a high concentration dope.

Lyotropic liquid crystal polymers such as polyphenylene benzobisoxazole (PBO) and polyphenylene benzobisthiazole (PBZT) can be formed into fibers that exhibit the highest tensile strength of any polymeric fiber (>500 ksi) These so-called "rigid rod" polymers when spun into fibers, coagulated and dried also exhibit excellent high temperature capability (up to 550° C.) and excellent resistance to organic solvents and most common acids. The spin dopes of these materials are supplied as high molecular weight (intrinsic viscosity >24 dL/g) nematic phase solutions of the polymer in polyphosphoric acid (PPA). The typical spin dope contains 12-15% polymer by weight.

High strength biaxially oriented thin films of these materials have been recited in U.S. Pat. Nos. 4,963,428, 4,973,442, and 6,132,668 issued to Foster-Miller, Inc., which films are prepared using a modified blown film extrusion process using a novel counter-rotating circular die to impart shear orientation to the nematic phase polymer. It has also been demonstrated that these biaxially oriented films when coagulated in water or some other non-solvent can form extremely strong open membranes when preserved in the wet, swollen state. Using solvent exchange techniques it has been shown that a number of different materials such as sol gel glasses, polymers, including ion conducting polymers, and other materials etc. can be infused or imbibed into this membrane structure. When dried, the liquid crystal polymer network shrinks (consolidates) around the imbibed material forming a very high strength structure that preserves the functional properties of the imbibed material.

U.S. Pat. No. 6,248,469 recites composite membranes and various methods of making same wherein ion conducting polymers (ICPs) are incorporated into the microporous PBO structure to produce a microcomposite proton exchange membrane (PEM) that would overcome the cost/performance problems of perfluorinated PEMs based on Dupont's Nafion polymer. Nafion type solid polymer electrolyte membranes exhibit long term stability of >20,000 hrs but cannot meet the needs for an automotive fuel cell due to high cost (~$770/m$^2$) and serious degradation of mechanical strength at operating temperatures of greater than 100° C. The '469 patent recited various composite membranes having a relatively low cost sulfonated aromatic polymers, such as sulfonated polyether sulfones or sulfide/sulfones, imbibed into an appropriate PBO membrane support structure. These lower cost aromatic ion conductors address the PEM cost problem and the PBO support structure addresses the mechanical strength issues, permitting fuel cell operation at optimally efficient temperatures between 100 to 150° C. These higher operating temperatures improve fuel cell efficiency, increase specific power and reduce the negative effect of CO on membrane electrode (MEA) platinum catalyst activity. Although composite membranes prepared from commercially available spin dope of 14.6 wt % PBO in PPA can produce a membrane support film with outstanding mechanical properties and increased electrochemical performance, still greater electrochemical output is still desirable.

Initial theoretical calculations indicated that a dope containing approximately 6-8 wt % PBO in PPA would yield membranes with sufficient open pore volume while retaining sufficient mechanical strength to produce composite membranes suitable for use in high electrochemical density fuel cell applications. Unfortunately, attempts to dilute the extremely viscous 14.6% PBO/PPA dope with additional PPA were not successful. Heterogeneous mixtures of PBO in PPA were produced which were not suitable for quality film preparation. Similarly, attempts to prepare 8% dope solutions of PBO in PPA by polymerization at a reduced reaction concentration resulted in mixtures which were not suitable for film/membrane production.

Very low concentration (~1 wt %) PBO solutions in methane sulfonic acid (MSA) have been prepared. MSA is a very strong acid and best known solvent for the lyotropic rigid rod polymers. PBO fiber can be dissolved in MSA using laboratory glassware and mixing equipment. This yielded a relatively low viscosity isotropic phase solution which could be used to make hand cast membranes with open pore volumes, e.g., membranes with greater than 90% porosity. Composite membranes comprising a variety of ion conducting polymers imbibed into PBO membranes prepared from the 1% in MSA dope solution have been prepared and exhibit electrochemical activity similar to Nafion membranes in single cell fuel cell test conducted at 80° C. Attempts to use composite membranes prepared from the 1% dope solution in fuel cells at temperatures greater than 80° C. were unsuccessful in part because the low concentration isotropic phase solutions in MSA did not have sufficient mechanical strength. Higher concentration PBO in MSA solutions cannot be obtained due to solubility and miscibility limitations of PBO above 1% by weight in MSA.

In view of these and other limitations observed in the art, it would be highly desirable to develop rigid rod or extended rod lyotropic liquid crystalline polymer dope solutions having a concentration less than that of the as-polymerized dope and greater than 1%. It would also be desirable to provide methods of making diluted dope solutions from high concentration as-polymerized solutions. It would also be desirable to develop improved solid polymer electrolyte membrane with high resistance to dehydration, high mechanical strength and stability to a range of operating temperatures of at least between at 80° C. and 150° C., more preferably between about 50° C. and 200° C. using diluted rigid rod or extended rod lyotropic liquid crystalline polymer dope solutions.

SUMMARY OF THE INVENTION

The present invention provides a solution formed by dilution comprising at least one rigid rod or extended rod lyotropic liquid crystalline polymer and at least one liquid where the solution concentration is greater than about 1.5 percent by weight and less than the as-polymerized concentration of the lyotropic liquid crystalline polymer.

The present invention further provides a method of preparing a solution of a rigid rod polymer in at least one liquid, wherein the solution comprises between about 1.5 by weight and less than the as-polymerized concentration of the lyotropic liquid crystalline polymer, the method comprising the steps of:

providing an as-polymerized dope solution of the lyotropic liquid crystalline polymer in at least one polymerization solvent; and introducing a diluent into the as-polymerized dope solution under conditions conducive to formation of a homogeneous lyotropic liquid crystalline polymer solution having between about 1.5 and less than the as-polymerized weight percent liquid crystalline polymer, wherein the diluent is selected from the group consisting of the polymerization solvent, a second liquid, or a solution or dispersion of an additive in the polymerization solvent or a second liquid.

The invention further provides articles of manufacture having a microporous structure prepared by coagulating at least one dilute rigid rod or extended rod lyotropic liquid crystalline polymer solution provided herein or prepared by a method provided herein. More particularly, the present invention provides articles of manufacture prepared by coagulating one or more dilute homogeneous solutions of the present invention, particularly the invention provides films, fibers and other articles which may be formed by coagulation of a dilute nematic phase or isotrophic phase rigid rod or extended rod lyotropic liquid crystalline polymer solution.

Other aspects of the invention are discussed infra.

DETAILED DESCRIPTION OF THE INVENTION INCLUDING PREFERRED EMBODIMENTS

Figure 1:
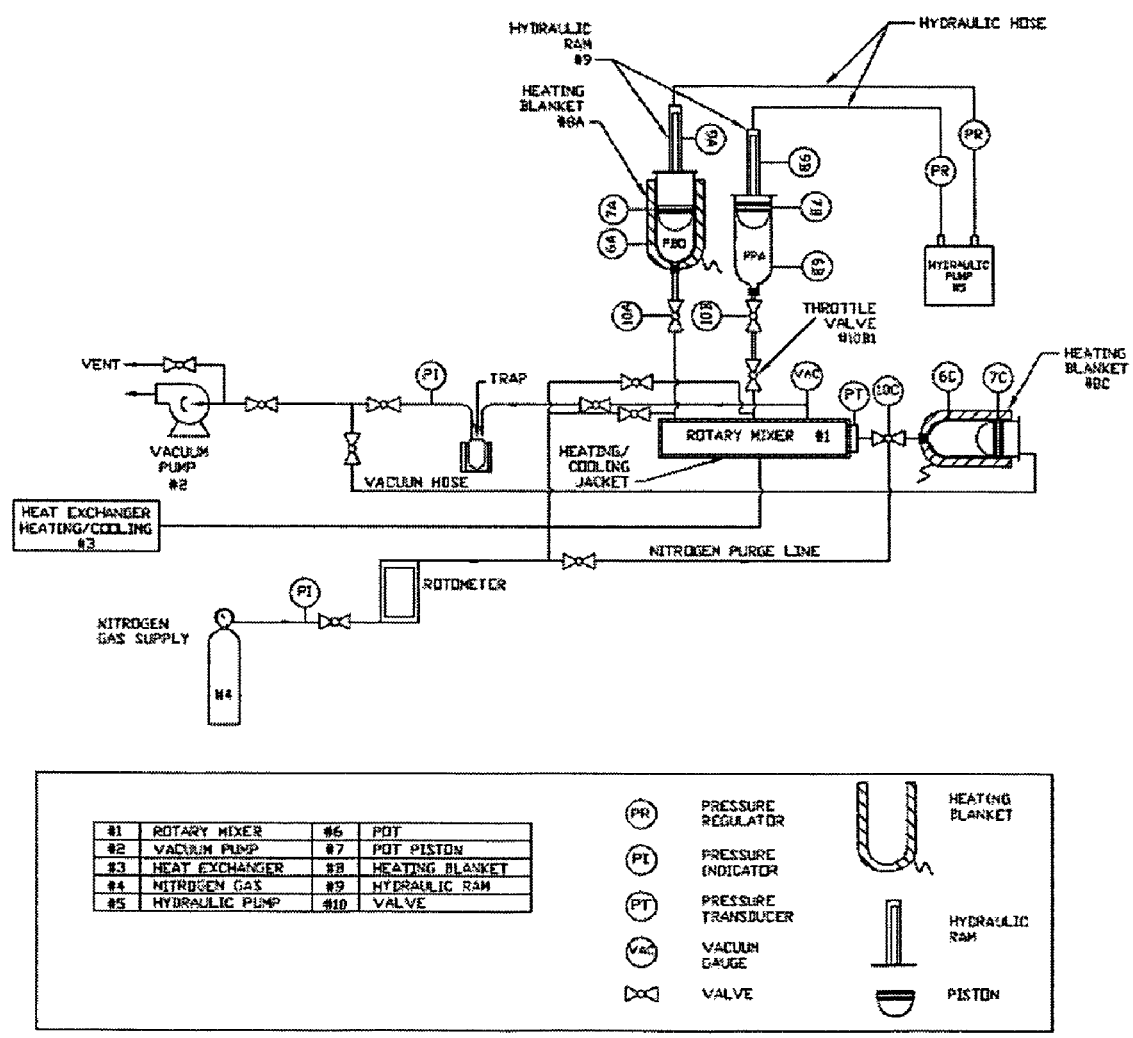
FIG. 1 is a schematic diagram of an apparatus suitable for homogeneous dilution of as-polymerized solutions of rigid rod and extended rod polymers.

We have discovered a method for forming dilute homogeneous solutions of rigid rod or extended rod lyotropic liquid crystalline polymers having a concentration of between 1.5% by weight and the as-polymerized concentration of the one rigid rod or extended rod lyotropic liquid crystalline polymer. The present invention also provides the first homogeneous solutions of one rigid rod or extended rod lyotropic liquid crystalline polymer having an intermediate concentration, e.g., a concentration of between 1.5% by weight and the as-polymerized concentration (which is typically between 14-18% by weight lyotropic liquid crystalline polymer). We have surprisingly discovered that articles of manufacture prepared from the solutions provided herein offer desirable physical and/or electrochemical properties which were not previously obtainable from either low concentration rigid rod or extended rod lyotropic liquid crystalline polymer solutions or from as-polymerized rigid rod or extended rod lyotropic liquid crystalline polymer solutions.

The term "as-polymerized" is intended to refer to polymer solutions obtained by solution phase polymerization. Thus, for example, "as-polymerized concentration" is intended to refer to the concentration of a polymer solution obtained after the polymerization reaction is complete. Various lyotropic liquid crystalline polymers are prepared in solution and distributed in the polymerization media, in part because lyotropic liquid crystalline polymers are notoriously difficult to dissolve in solution. Thus, for example, PBO is prepared and distributed as a 14.6% by weight solution in polyphosphoric acid, which solution is referred to herein as "as-polymerized."

In one aspect, the invention provides a solution formed by dilution comprising at least one rigid rod or extended rod lyotropic liquid crystalline polymer and at least one liquid where the solution concentration is greater than about 1.5 percent by weight and less than the as-polymerized concentration of the lyotropic liquid crystalline polymer.

In certain preferred solutions provided by the invention, the concentration of the rigid rod or extended rod lyotropic liquid crystalline polymer is greater than about 1.5% by weight and less than about 90% of the as-polymerized concentration of the lyotropic liquid crystalline polymer.

In certain other preferred solutions provided by the invention, at least a portion of the liquid is a solvent present during polymerization of the rigid rod or extended rod lyotropic liquid crystalline polymer.

Yet other preferred rigid rod or extended rod lyotropic liquid crystalline polymer solutions include those in which the solution is in a nematic phase. Preferred nematic polymer solutions include those in which the solution concentration is between the critical concentration ($c_{crit}$) and the as-polymerized concentration of the lyotropic liquid crystalline polymer, wherein $c_{crit}$ is the concentration at which a rigid rod or extended rod lyotropic liquid crystalline polymer transfers from an isotropic to a nematic phase.

Other preferred rigid rod or extended rod lyotropic liquid crystalline polymer solutions include those in which the solution is in an isotropic phase. Preferred isotropic phase polymer solutions include those in which the solution is between 1.5% by weight liquid crystalline polymer and $c_{crit}$.

Certain preferred rigid rod or extended rod lyotropic liquid crystalline polymer solutions provided by the invention include homogeneous solutions comprising polyphosphoric acid and at least one lyotropic liquid crystalline polymer selected from polybenzoxazole (PBO), polybenzothiazoles (PBZT), and polybenzimidizoles (PBI) wherein the solution comprises between 1.5% by weight and less than the as-polymerized weight percent of the lytotropic liquid crystalline polymer.

Certain other preferred rigid rod or extended rod lyotropic liquid crystalline polymer solutions provided by the invention include those solutions in which the lyotropic liquid crystalline polymer comprises a rigid rod or extended rod polymer according to Formula I or Formula II:

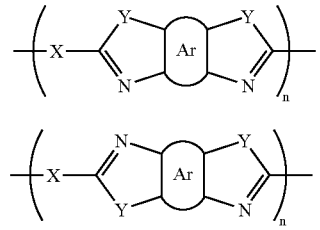

wherein X is selected from aryl and heteroaryl groups and Y is selected from O, S, or NH.

Certain preferred solutions include dilute polybenzoxazole solutions having a concentration of between 1.5% and 13.1% by weight (e.g., between 1.5% by weight and the as-polymerized concentration of PBO). In certain preferred dilute polybenzoxazole solutions, the polybenzoxazole concentration is between about 1.5% and about 12% by weight.

Certain other preferred solutions include dilute polybenzothiazole solutions having a concentration of between 1.5% and 13.1% by weight (e.g., between 1.5% by weight and the as-polymerized concentration of PBZT). In certain preferred dilute polybenzothiazole solutions, the polybenzothiazole concentration is between about 1.5% and about 12% by weight.

Certain other preferred solutions include dilute polybenzimidizole solutions having a concentration of between 1.5% and 17% by weight (e.g., between 1.5% by weight and the as-polymerized concentration of PBI). In certain preferred dilute polybenzimidizole solutions, the polybenzimidizole concentration is between about 1.5% and about 16% by weight.

Preferred diluted lyotropic liquid crystalline polymer solutions of the invention comprises at least one lyotropic liquid crystalline polymer and at least one liquid. Preferred liquids comprise at least one solvent of the lyotropic liquid crystalline polymer. The term solvent, as used herein, is intended to mean a substance, usually a liquid, in which another substance is dissolved. Thus a solvent is a liquid in which a lyotropic liquid crystalline polymer can be dissolved. Certain preferred solvents for use in the solutions of the invention include strong acids. Preferred strong acid solvents include, but are not limited to, polyphosphoric acid, phosphoric acid, sulfuric acid, fuming sulfuric acid, methane sulfonic acid, trifluoromethane sulfonic acid, and mixtures thereof. In certain preferred embodiments, including preferred dilute PBO and PBZT solutions, the solvent is polyphosphoric acid.

In certain preferred diluted lyotropic liquid crystalline polymer solutions of the invention the liquid comprises a solvent present during the polymerization process and optionally comprises one or more liquid diluents. Preferred diluents may be solvents or non-solvents of the lyotropic liquid crystalline polymer, wherein non-solvent diluents are typically added at a concentration insufficient to induce phase separation of the lyotropic liquid crystalline polymer (i.e., precipitation) from the diluted solution.

In certain applications, it may be desirable to incorporate one or more non-lyotropic liquid crystalline polymer materials into the dilute lyotropic liquid crystalline polymer solution of the invention. Thus, in certain preferred embodiments, the dilute lyotropic liquid crystalline polymer solution comprises one or more additives. Typically preferred additives include, but are not limited to, strengthening agents, hardening agents, plasticizers, electroconductive materials, optical modifiers, and the like. The dilute lyotropic liquid crystalline polymer solution comprises one or more additives which are soluble in the liquid and the solution is a homogeneous fluid phase.

In certain other embodiments, the dilute lyotropic liquid crystalline polymer solution comprises one or more additives, of which at least one additive is insoluble or sparingly soluble in the liquid such that the solution comprises a uniform dispersion of additive particles in the solution of the solvent and the rigid rod or extended rod lyotropic liquid crystalline polymer. For dilute lyotropic liquid crystalline polymer solution comprising a uniform dispersion of additive particles, the average particle size is typically between about 10 nm and about 1 μM, between about 50 nm and about 1 μm, or between about 100 nm and about 750 μm. In certain other dilute lyotropic liquid crystalline polymer solution comprising a uniform dispersion of additive particles, the average particle size of the additive particles is at least about 150 nm.

In other aspects, the invention provides a method of preparing a solution of a rigid rod polymer, wherein the solution comprises between about 1.5 and less than the as-polymerized concentration of the lyotropic liquid crystalline polymer, the method comprising the steps of:

providing an as-polymerized dope solution of the lyotropic liquid crystalline polymer in at least one polymerization solvent; and introducing a diluent into the as-polymerized dope solution under conditions conducive to formation of a homogeneous lyotropic liquid crystalline polymer solution having between about 1.5 and less than the as-polymerized weight percent liquid crystalline polymer.

In certain preferred dilution methods provided by the invention, the diluent is the polymerization solvent or the diluent is liquid other than the polymerization solvent. Typically liquids other than the polymerization solvent are selected from liquids which are capable of solubilizing the lyotropic liquid crystalline polymer. Yet other preferred second liquids include liquids which do not solubilize the lyotropic liquid crystalline polymer, e.g., non-solvents. Typically preferred non-solvents include those liquids which when incorporated into the dilute homogeneous lyotropic liquid crystalline polymer solution do not induce polymer precipitation.

The term "homogeneous" and "homogeneous lyotropic liquid crystalline polymer solution" are intended to refer to solutions and solutions having solid particles dispersed therein from which a membrane or film can be prepared by casting, extruding, compression or other film or membrane forming technique discussed herein. Homogeneous lyotropic liquid crystalline polymer solutions will generally have a substantially uniform composition throughout the solution or dispersion such that films and membranes formed from the solution or dispersion will have a substantially uniform composition.

In certain other dilution methods provided by the invention, the diluent comprises at least one additive. Typically the diluent comprising an additive is a homogeneous solution of additive dissolved in the polymerization solvent or a second liquid or the diluent comprising an additive is a dispersion of additive particles dispersed in the polymerization solvent or in a second liquid.

In certain preferred dilution methods, it may be desirable to incorporate one or more non-lyotropic liquid crystalline polymer materials into the dilute lyotropic liquid crystalline polymer solution of the invention. Thus, in certain preferred embodiments, the diluent added to the as-polymerized solution comprises one or more additives. Typically preferred additives include, but are not limited to, strengthening agents, hardening agents, plasticizers, electroconductive materials, optical modifiers, and the like. The dilute lyotropic liquid crystalline polymer solution comprises one or more additives which are soluble in the diluent and in the liquid of the diluted lyotropic liquid crystalline polymer solution such that the product solution is a homogeneous fluid phase.

In certain other embodiments, the method provides a dilute lyotropic liquid crystalline polymer solution which comprises one or more additives, of which at least one additive is insoluble or sparingly soluble in the liquid such that the solution comprises a uniform dispersion of additive particles in the solution of the solvent and the rigid rod or extended rod lyotropic liquid crystalline polymer. Typically, for dilute lyotropic liquid crystalline polymer solution comprising a uniform dispersion of additive particles, the diluent comprises a dispersion of additive particles in which the average particle size is typically between about 10 nm and about 1 µm, between about 50 nm and about 1 µm, or between about 100 nm and about 750 µm. In certain other preferred dilution methods the diluent is a dispersion comprising a uniform dispersion of additive particles, the average particle size of the additive particles is at least about 150 nm.

In certain preferred dilution methods provided by the invention, the concentration of the diluted rigid rod or extended rod lyotropic liquid crystalline polymer is greater than about 1.5% by weight and less than about 90% of the as-polymerized concentration of the lyotropic liquid crystalline polymer. Thus, the diluent introducing step of the method incorporates sufficient diluent to reduce the concentration of the as-polymerized lyotropic liquid crystalline polymer solution by at least about 10% such that the final concentration is between 1.5% by weight and 90% of the as-polymerized concentration.

In certain other preferred dilution methods provided by the invention, at least a portion of the liquid is the solvent present during polymerization of the rigid rod or extended rod lyotropic liquid crystalline polymer.

Yet other preferred dilution methods include those in which the product solution is in a nematic phase. Preferred nematic polymer solutions include those in which the solution concentration is between the critical concentration ($c_{crit}$) and the as-polymerized concentration of the lyotropic liquid crystalline polymer, wherein $c_{crit}$ is the concentration at which a rigid rod or extended rod lyotropic liquid crystalline polymer transfers from an isotropic to a nematic phase.

Other preferred dilution methods include those in which the product solution is in an isotropic phase. Preferred isotropic phase polymer solutions include those in which the solution is between 1.5 weight % liquid crystalline polymer and $c_{crit}$.

In certain preferred dilution methods provided by the invention, the high concentration homogeneous dope solution, e.g., the as-polymerized solution of the lyotropic liquid crystalline polymer, is subject to high shear mechanical mixing during the introduction of the diluent.

In yet other preferred dilution methods of the invention, the conditions permitting the formation of the homogeneous lyotropic polymer solution comprise: (1) applying a shearing force to the as polymerized dope solution; (2) degassing the sheared as polymerized homogeneous dope solution; and (3) applying a shearing force while introducing the diluent into the sheared and degassed as polymerized dope solution. Preferred devices capable of generating a suitable shearing force for the dilution methods of the invention include a twin screw extruder, a Banbury mixer, a paddle-type co-rotating processor, or shear-generating mixers.

In certain preferred dilution methods of the invention, the diluent is introduced while the solution is subjected to high mechanical shear mixing. In preferred dilution methods the high mechanical shear mixing process is conducted in a vacuum or in the absence of gaseous materials. In other dilution methods, the diluent and the as-polymerized lyotropic liquid crystalline polymer solution are degassed prior to use in the dilution method and/or the dilution is conducted under an active vacuum capable of removing gaseous components of the diluent or the as-polymerized lyotropic liquid crystalline polymer solution during the dilution process.

In certain preferred dilution methods of the invention, the introduction of diluent is carried out at a temperature at which the as-polymerized solution has a sufficiently reduced viscosity to permit fluid transport of the as-polymerized solution through the apparatus depicted in FIG. 1. More preferably, the introduction of the diluent is conducted at a temperature of between about 15° C. and about 250° C., or more preferably between 15° C. and about 150° C.

In certain preferred dilution methods of the invention, rigid rod or extended rod lyotropic liquid crystalline polymer solutions which are suitable for dilution include homogeneous solutions comprising polyphosphoric acid and at least one lyotropic liquid crystalline polymer selected from polybenzoxazole (PBO), polybenzothiazoles (PBZT), and polybenzimidizoles (PBI).

Certain preferred rigid rod or extended rod lyotropic liquid crystalline polymer solutions which are suitable for dilution by the methods provided herein, include those solutions in which the lyotropic liquid crystalline polymer comprises a rigid rod or extended rod polymer according to Formula I or Formula II as described above.

The dilution methods of the invention provide dilute polybenzoxazole solutions having a concentration of between 1.5% and 13.1% by weight (e.g., between 1.5% by weight and the as-polymerized concentration of PBO). In certain preferred dilute polybenzoxazole solutions, the polybenzoxazole concentration is between about 1.5% and about 12% by weight.

The dilution methods of the invention provide dilute polybenzothiazole solutions having a concentration of between 1.5% and 13.1% by weight (e.g., between 1.5% by weight and the as-polymerized concentration of PBZT). In certain preferred dilute polybenzothiazole solutions, the polybenzothiazole concentration is between about 1.5% and about 12% by weight.

The dilution methods of the invention provide dilute polybenzimidizole solutions having a concentration of between 1.5% and 17% by weight (e.g., between 1.5% by weight and the as-polymerized concentration of PBI). In certain preferred dilute polybenzimidizole solutions, the polybenzimidizole concentration is between about 1.5% and about 16% by weight.

Preferred dilution methods of the invention provide diluted lyotropic liquid crystalline polymer solutions comprising a lyotropic liquid crystalline polymer having substantially the same molecular weight as the lyotropic liquid crystalline polymer present in the as-polymerized solution prior to dilution. Thus, the mechanical mixing and/or shear forces applied to the as-polymerized dope solution during the dilution methods of the invention do not induce chain cleavage of the lyotropic liquid crystalline polymer such that the lyotropic liquid crystalline polymer component of the diluted solution has substantially the same polydispersity, the same weight average molecular weight, and the same number average molecular weight as the lyotropic liquid crystalline polymer prior to dilution.

In yet another aspect, the invention provides articles of manufacture having a microporous structure prepared by coagulating at least one dilute lyotropic liquid crystalline polymer solution provided by the invention or by coagulating at least one solution prepared by the dilution methods of the invention. Typically preferred articles of manufacture include films and fibers comprising a microporous lyotropic liquid crystalline polymer. In certain preferred film or fibers provided by the invention, the film or fiber comprises a microporous structure having between about 25% and 75% rigid rod or extended rod lyotropic liquid crystalline polymer by volume.

In yet other aspects, the invention provides ion conducting membranes comprising an ion conducting material and a microporous film prepared by coagulating at least one dilute lyotropic liquid crystalline polymer solution provided by the invention or by coagulating at least one solution prepared by the dilution methods of the invention.

The term "solvent" is intended to mean a substance, usually a liquid, in which another substance is dissolved.

The term "diluent" is intended to mean a substance, usually a liquid or dispersion of a particulate solid in a liquid, which is added to an as-polymerized lyotropic liquid crystalline polymer dope solution in order to decrease the concentration of the lyotropic liquid crystalline. Thus, for example, PPA can be added as a diluent to a 14.6% by weight solution of PBO in PPA to generate a PBO in PPA solution having a PBO concentration of less than 14.6% by weight.

The term "strong acid" is intended to refer to acids capable of protonating at least a portion of the basic functional groups of the lyotropic liquid crystalline polymers present in the diluted solutions prepared and provided by the instant invention. Typically preferred strong acids have a pH of less than about 2.5 and include, but are not limited to, polyphosphoric acid, phosphoric acid, sulfuric acid, fuming sulfuric acid, methane sulfonic acid, trifluoromethane sulfonic acid, and mixtures thereof.

The term "polyphosphoric acid" is intended to refer to acidic phosphorus-oxygen compounds prepared, for example, by condensation of phosphoric acid and phosphorus pentoxide. Thus, polyphosphoric acid can be represented by the formula $HO[(P(O)OH)]_nOH$ where n is greater than 1. However, the term "polyphosphoric acid" is further intended to include acidic phosphorus-oxygen compounds which comprise branched or cyclic structures.

The term "as-polymerized" is intended to refer to polymer solutions obtained by solution phase polymerization. Thus, for example, "as-polymerized concentration" is intended to refer to the concentration of a polymer solution obtained after the polymerization reaction is complete. Various lyotropic liquid crystalline polymers are prepared in solution and distributed in the polymerization media, in part because lyotropic liquid crystalline polymers are notoriously difficult to dissolve in solution. Thus, for example, PBO is prepared and distributed as a 14.6% by weight solution in polyphosphoric acid, which solution is referred to herein as "as-polymerized."

The term "substituted", as used herein, means that any one or more hydrogens on the designated atom is replaced with a group selected from the defined list, provided that the designated atom's normal valence is not exceeded, and that the substitution results in a stable compound. When a substituent is keto (i.e., =0), then 2 hydrogens on the atom are replaced. Keto substituents are not directly attached to aromatic ring atoms.

When any variable occurs more than one time in any constituent or formula for a compound, its definition at each occurrence is independent of its definition at every other occurrence. Thus, for example, if a group is shown to be substituted with 0-2 R*, then said group may optionally be substituted with up to two R* groups and R* at each occurrence is selected independently from the definition of R*. Also, combinations of substituents and/or variables are permissible provided that such combinations result in stable compounds.

As indicated herein, various substituents of the compounds of the present invention and various formulae set forth herein are "optionally substituted." When substituted, those substituents can be substituted at one or more of any of the available positions, typically 1, 2, 3, 4, or 5 positions, by one or more suitable groups such as those disclosed herein.

Suitable groups or "substituted" moieties for hydrogen atoms in compounds of the invention include, e.g., halogen such as fluoro, chloro, bromo or iodo; cyano; hydroxyl; nitro; azido; alkanoyl, such as a $C_{1-6}$ alkanoyl group such as acyl and the like; carboxamido; alkyl groups including those groups having 1 to about 12 carbon atoms, preferably 1-6 carbon atoms; alkenyl and alkynyl groups including groups having one or more unsaturated linkages and from 2 to about 12 carbon atoms, preferably 2-6 carbon atoms; alkoxy groups including those having one or more oxygen linkages and from 1 to about 12 carbon atoms, preferably 1-6 carbon atoms; aryloxy groups such as phenoxy and benzyloxy; alkylthio groups including those moieties having one or more thioether linkages and from 1 to about 12 carbon atoms, preferably 1-6 carbon atoms; alkylsulfinyl groups including those moieties having one or more sulfinyl linkages and from 1 to about 12 carbon atoms, preferably 1-6 carbon atoms; alkylsulfonyl groups including those moieties having one or more sulfonyl linkages and from 1 to about 12 carbon atoms, preferably 1-6 carbon atoms; aminoalkyl groups such as groups having one or more N atoms and from 1 to about 12 carbon atoms, preferably 1-6 carbon atoms; carbocyclic aryl groups having 6 or more carbons, particularly phenyl and benzyl (e.g., wherein an Ar group can be substituted or unsubstituted biphenyl moiety); arylalkyl having 1 to 3 separate or fused rings and from 6 to about 18 carbon ring atoms, with benzyl being a preferred group; arylalkoxy having 1 to 3 separate or fused rings and from 6 to about 18 carbon ring atoms, with O-benzyl being a preferred group; or a heteroaromatic or heteroalicyclic group having 1 to 3 separate or fused rings with 3 to about 8 members per ring and one or more N, O or S atoms.

As used herein, "alkyl" is intended to include both branched and straight-chain saturated aliphatic hydrocarbon groups, having the specified number of carbon atoms. Examples of alkyl include, but are not limited to, methyl, ethyl, n-propyl, i-propyl, n-butyl, s-butyl, t-butyl, n-pentyl, and s-pentyl. Preferred alkyl groups are lower alkyl groups having from 1 to about 6 carbon atoms. The term $C_{1-6}$ alkyl as used herein means alkyl groups consisting of 1 to 6 carbon atoms, which may contain a cyclopropyl moiety.

"Cycloalkyl" is intended to include saturated ring groups, having a specified number of carbon atoms, such as cyclopropyl, cyclobutyl, cyclopentyl, or cyclohexyl and bridged or caged saturated ring groups such as norbornane or adamantane and the like. Preferred cycloalkyl groups are cycloalkyl groups having from 3 to about 8 ring atoms. The term $C_{3-8}$ cycloalkyl as used herein means cycloalkyl groups consisting of a aliphatic ring with 3 to 8 atoms in the ring.

"Alkenyl" is intended to include hydrocarbon chains of either a straight or branched configuration comprising one or more unsaturated carbon-carbon bonds, which may occur in any stable point along the chain such as, e.g., ethenyl and propenyl. Preferred alkenyl groups are lower alkenyl groups having from 2 to about 6 carbon atoms. The term $C_{2-6}$ alkenyl as used herein means alkenyl groups consisting of 2 to 6 carbon atoms.

"Alkynyl" is intended to include hydrocarbon chains of either a straight or branched configuration comprising one or more triple carbon-carbon bonds that may occur in any stable point along the chain such as, e.g., ethynyl and propynyl. Preferred alkynyl groups are lower alkynyl groups having from 2 to about 6 carbon atoms. The term $C_{2-6}$ alkynyl as used herein means alkynyl groups consisting of 2 to 6 carbon atoms.

As used herein, the term "heterocyclic group" is intended to include saturated, partially unsaturated, or unsaturated (aromatic) groups having 1 to 3 (preferably fused) rings with 3 to about 8 members per ring at least one ring containing an atom selected from N, O or S. The nitrogen and sulfur heteroatoms may optionally be oxidized. The term or "heterocycloalkyl" is used to refer to saturated heterocyclic groups.

As used herein, the term "aryl" includes groups that contain 1 to 3 separate or fused rings and from 6 to about 18 ring atoms, without hetero atoms as ring members. Specifically preferred carbocyclic aryl groups include phenyl, and naphthyl including 1-napthyl and 2-naphthyl.

"Haloalkyl" is intended to include both branched and straight-chain saturated aliphatic hydrocarbon groups having the specified number of carbon atoms, substituted with 1 or more halogen (for example $—C_v(X^i)_{wi}(H_{2v+1-\Sigma(wi)})$ where v=1 to 6; $X^i$=F(i=1), Cl(i=2), Br(i=3), I(i=4) and $\Sigma w_i \leq 2v+1$). Examples of haloalkyl include, but are not limited to, trifluoromethyl, trichloromethyl, pentafluoroethyl, and pentachloroethyl. Preferred haloalkyl groups are lower halolkyl groups having from 1 to about 6 carbon atoms. The term $C_{1-6}$ haloalkyl as used herein means haloalkyl groups consisting of 1 to 6 carbon atoms.

As used herein, the term "hydrocarbon group" is intended to include alkyl, cycloalkyl, alkenyl, alkynyl, and aryl groups or a group that comprises a combination of two or more alkyl, cycloalkyl, alkenyl, alkynyl or aryl group regions. Hydrocarbon groups may further comprise heteroatoms such as N, O, F, Si, S, Cl, Br and the like. Preferably, hydrocarbon groups have from 0 to about 3 heteroatoms. The term lower hydrocarbon group as used herein means a hydrocarbon group consisting of 1 to 6 carbon atoms which may include 1, 2, or 3 heteroatoms.

"Alkoxy" means an alkyl group as defined above with the indicated number of carbon atoms attached through an oxygen bridge. Examples of alkoxy include, but are not limited to, methoxy, ethoxy, n-propoxy, i-propoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy. Preferred alkoxy groups are lower alkoxy groups having from 1 to about 6 carbon atoms.

The term "halogen" means fluorine, chlorine, bromine, or iodine.

The invention now being generally described, it will be more readily understood by reference to the following examples, which are included merely for purposes of illustration of certain aspects and embodiments of the present invention, and are not intended to limit the invention.

Applicants have surprisingly discovered methods of preparing dilute lyotropic liquid crystalline polymer solutions having a concentration less than the as-polymerized concentration and greater than about 1.5% by weight. Thus the present invention provides dilute polymer dopes of lyotropic liquid crystal polymers and methods for achieving same in various solvents including polyphosphoric acid (PPA). The diluted dope solutions typically have a concentration of less than the as-polymerized concentration which is typically between about of 15 to 18% polymer by weight. Lyotropic liquid crystalline polymers are readily prepared at concentrations of between 15 and 18% by weight in PPA and generally have high molecular weights and high mechanical strength.

In certain preferred embodiments, specialized equipment and process conditions are necessary to successfully produce these diluted dopes (e.g., dilute lyotropic liquid crystalline polymer solutions) without any significant loss of polymer molecular weight. The dilute lyotropic liquid crystalline polymer solutions provided herein have reduced viscosity compared to the as-polymerized dopes and, therefore, are more amendable to processing into fibers, films, microporous membranes, and other articles of manufacture. The fibers, films, microporous membranes, and other articles of manufacture prepared from the dilute dope solutions provide high strength provided by articles made from the as-polymerized dope solution and additionally provide various desirable morphological and physical characteristics not easily attained by processing from higher viscosity, as-polymerized dope solutions.

The equipment used is a specialized combination of commercially available process equipment designed to provide high shear mixing of a very high viscosity polymer dope with a very low viscosity fluid such as PPA in an inert atmosphere to provide a homogeneous dope that is (1) gas free, (2) retains it's high molecular weight, and (3) has a concentration of between about 1.5% by weight and about 90% of the as-polymerized concentration. Thus, an as-polymerized polymer/solvent mixture having a high viscosity can be efficiently mixed with a low viscosity diluent to form a diluted mixture having a final polymer concentration of between 1.5% by weight to about 90% of the as-polymerized concentration wherein the process conditions are regulated to permit rapid mixing of the high viscosity dope and the low viscosity diluent such that a minimum of molecular scission occurs due to the action of the high shear mixer. In typical dilution methods, a PPA dope solution having a polymer concentration of between 15-18% by weight is diluted with additional PPA to a concentration of between 1.5% and about 14%.

The description of diluting a 14.6% PBO solution in PPA using a high shear mixer is described in reference to the schematic drawing presented in the accompanying drawings, wherein like reference numerals refer to like parts throughout the several views. Referring to FIG. 1, in accordance with the principles of the present invention, there is illustrated a schematic representation of a polymer dope mixing system 100 suitable for use in the dilution methods of the invention. The system includes a high shear mixer 1, a vacuum pump 2, a heat exchange assembly 3, a nitrogen gas supply 4, a hydraulic pump 5, various vessels 6A, 6B, and 6C, which are equipped with pistons 7A, 7B, and 7C, and heating blankets 8A, 8B, 8C, and 8D.

The high shear mixer 1 can be a static batch type mixer such as a Banbury mixer or a rotary paddle type compounding mixer or a continuous feed mixer such as a twin screw extruder or a continuous rotary paddle type mixer.

The vacuum pump 2 is connected to the mixer 1 using appropriate heavy duty vacuum hoses providing sufficient pumping power to maintain extremely low pressures—down to about 100 millitorr—in the mixer to minimize the possibility of gas entrapment in the dope.

A source of nitrogen gas 4 is also plumbed into the system to allow filling of the ullage in the mixer with an inert gas when the mixer is brought up to atmospheric pressure during the discharge of the polymer dope at the conclusion of the mixing cycle.

Both heating and cooling of the mixer are required to properly adjust mixing conditions to minimize time required to achieve complete mixing. This is most easily accomplished using a heat transfer fluid such as mineral oil or water and circulating this fluid from a heat exchanger 3 to a heating/cooling jacket enclosing the mixer.

In the following sections two preferred embodiments are described: The first is the dilution of PBO dope having a nominal concentration as polymerized of 14.6 weight % PBO polymer in PPA to a concentration of 8.0 weight % PBO in PPA. At this concentration the PBO polymer is still in the nematic (ordered phase). The second is the dilution of PBO dope having a nominal as polymerized concentration of 14.6 weight % PBO polymer in PPA to a concentration of 3.0 weight % PBO in PPA. At this lower concentration the PBO polymer is in the isotropic (dis-ordered phase).

EXAMPLE 1

Dilution of 14.6% PBO/PPA Dope to 8.0% PBO/PPA Dope

Referring to FIG. 1, PBO polymer dope is supplied by Toyobo Co., Ltd of Tokyo, Japan as a 14.6 weight % PBO in PPA mixture in stainless steel vessel 6A containing approximately 10 pounds of polymer dope. The vessel 6A has a 1 inch NPT thread at one end and a 5 inch domed piston 7A with two sealing "O" rings to form a gas tight seal within the body of the container. At the chemical plant the polymer dope which is at a temperature of approximately 120° C. is forced under pressure directly from the sealed polymerization process into the 1 inch diameter fill/discharge end of vessel 6A forcing the piston 7A back until the vessel is completely filled (piston 7A is pushed to the top of the vessel 6A/limit of its travel. When completely filled the vessel 6A is then capped at the fill/discharge end with a 1 inch diameter pipe cap to form a gas tight seal. The viscosity of the 14.6% PBO/PPA dope at room temperature is solid or very similar to that of a brick. In order to discharge this extremely viscous material from the vessel 6A it must first be heated to a temperature of 120° C. by an electric heating blanket 8A to reduce the viscosity to a point where it can be pushed out of the vessel 6A by the piston 7A using hydraulic pressure from hydraulic pump 5 acting on hydraulic ram 9A. A pressure of 1500 psi is sufficient to flow the dope out of the vessel into the mixer 1, which is under vacuum. The dope containing vessel 6A is preheated by electric heating blanket #8A for approximately 6 hours prior to the start of the mixing run to insure that the polymer dope is at a uniform temperature of 120° C.

The diluent is prepared in vessel 6B. Polyphosphoric acid, which is used as the diluent, is poured into an empty clean vessel 6B with the piston 7B withdrawn to its maximum length of travel. The PPA is degassed after charging vessel 6B prior to use in the mixing process, in part because PPA often has a significant amount of entrapped air. Degassing is accomplished by heating vessel 6B to 100° C. with an electric heating blanket 8B and pulling a vacuum on the head space of the partially filled vessel. After about 4 hours, vessel 6B contains essentially gas-free PPA, which has a consistency of Karo syrup at room temperature. Once cooled to room temperature the piston 7B is manually pushed up so that the diluent level completely fills the 1 inch diameter discharge/fill pipe on vessel 6B. A 1 inch diameter female stainless steel ball valve 10 in the closed position is affixed to the discharge/fill pipe to form a gas tight seal on diluent vessel 6B.

Vessels 6A and 6B are attached to valves 10A and 10B, which are in fluid contact with mixer 1 as shown in FIG. 1. Hydraulic rams 9A and 9B connected by high pressure hydraulic hoses to hydraulic pump 5 are then mounted on the flanges of vessels 6A and 6B to move the pistons 7A and 7B to assist in feeding the polymer dope and diluent into mixer 1.

Mixer 1 is prepared for use in the dilution method by first turning on the vacuum pump 2 and pulling a vacuum on the mixer chamber to form pressure of about 100 millitorr. Simultaneously, heating jacket 8D warms the mixer 1 to 120° C. The rotating elements of the batch mixer used in this embodiment are rotated at a speed of 30 RPM. Once the temperature, vacuum levels and rotating speed of the mixing elements have stabilized, hydraulic ram 9A on polymer feed vessel 6A is pressurized to 1500 psi by hydraulic pump 5 and feed valve 10A is opened to allow flow of the polymer dope into the mixer 1. As-polymerized dope solution (14.6% PBO/PPA, 2.81 kilograms) was introduced into the mixer 1. After 26 minutes, all of the as-polymerized dope solution was added to the mixer. Feed valve 10A was then closed and hydraulic pressure from pump 5 to hydraulic ram 9A was discontinued. After complete addition of the as-polymerized dope, the torque on the rotating shafts of the mixer increased to about 66.9 Nm/ltr and the rotation rate of the shafts decreased from 30 rpm to 18 rpm. After an 14 additional minutes of mixing, "opened" the viscous 14.6% polymer dope solution sufficiently to permit mixing with the low-viscosity diluent.

Piston 7B was pressurized by hydraulic ram 9B by hydraulic pump 5 forty minutes after commencing addition of the as-polymerized dope solution to mixer 1. Pressurizing vessel 7B with only 300 psig was sufficient to transfer the relatively low viscosity diluent (e.g., PPA). Valve 10B was opened and then needle valve 10B1 was opened to allow a flow of diluent into the mixer 1, wherein the rate of addition of diluent to the mixer was 114 g/minute. After 20 minutes, all of the diluent is introduced into the mixer (2.27 kg of diluent (PPA)), and the needle valve 10B1 was closed followed by the closure of on/off valve 10B and hydraulic pressure on piston 7B via ram 9B was discontinued. At the end of the PPA feed the rotating element speed had recovered to its original set point of 30 rpm and the specific torque had decreased to 58.3 Nm/ltr. After an additional 1.5 hours in the mixer, the material was discharged from the mixer through discharge port valve 10C into receiving vessel 6C, which was heated to 60° C. The isolated homogeneous diluted PBO solution recovered from the mixer weighted 3.13 kg and had a PBO loading of about 7.7% by weight relative to PPA.

Intrinsic Viscosity measurements showed that the diluted dope had an Intrinsic Viscosity of 21.3 dL/g as compared to an original Intrinsic Viscosity of 23.0 dL/g for the as received dope indicating that the molecular weight reduction was less than 1%. Subsequent mechanical tests of polymer films produced from this lower concentration dope confirmed this by measuring tensile strengths approximately equal to those of films produced from the 14.6% dope. Mechanical properties of extruded biaxially oriented blown films from both the 14.6% and 7.7% dopes produced under similar process conditions are listed in Table 1 which follows.

TABLE 1

Physical characteristics for biaxially oriented blown films prepared from dope solutions having 14.6% and 7.7% by weight PBO in PPA.

| Dope Concentration | Tensile Strength (ksi) | | Tensile Modulus (ksi) | | Viscosity dL/g |
|---|---|---|---|---|---|
| | MD[1] | TD[2] | MD[1] | TD[2] | IV |
| 14.6 | 107.4 | 59.3 | 6222 | 3300 | 23.0 |
| 7.7 | 110.2 | 50.2 | 3568 | 2242 | 21.3 |

[1]denotes machine direction;
[2]denotes transverse direction.

EXAMPLE 2

Dilution of 14.6% PBO/PPA Dope to 3.0% PBO/PPA Dope

An isotropic PBO dope having 3% PBO in PPA by weight was prepared from a 14.6% nematic phase PBO dope using the dilution method and apparatus recited in Example 1 and depicted schematically in FIG. 1.

The amounts of reagents and process times were modified as follows: 14.6% dope (1.06 kg) was introduced over 15 minutes with an additional 10 minutes of mixing to complete opening of the dope prior to addition of the diluent. Polyphosphoric acid (PPA; 2.27 kg) was added at a rate of 114 g/minute and diluted dope was mixed for 1.5 hours after complete addition of the PPA.

The diluted dope was in an isotropic phase and had 3.19% by weight PBO in PPA. The measured intrinsic viscosity was 18.5 indicating less than a 5% reduction in molecular weight during the dilution process.

EXAMPLE 3

Dilute PBO Dope Having an Ion-Conducting Polymer Additive

A solution of poly(styrene sulfonic acid) (PSSA; 80.5 g) was prepared in poly(phosphoric acid) (PPA, 1530 g). This solution was mixed with a 14.6% solution of PBO in PPA (943 g) using a high shear mixer to form a 7% solution according to the method described in Example 1. Diluted dope solution was shaped into a film in a hydraulic press under high pressure (500 psi). The film was then coagulated and dried at 175° C. under a dry dinitrogen atmosphere. The film was then tested for conductivity at 150° C. in dry conditions (low relative humidity; no pressurization) using a four-point conductivity measurement. Elemental analysis was also performed to determine the actual ratio of PBO:acid in the dried film.

Table 2 below shows the data from this films as compared to a comparative example prepared by imbibed the ion-conductive material into a preconfigured microporous PBO membrane (See, the examples in U.S. Pat. No. 6,248,469).

TABLE 2

Relative Acid/Base concentration and Conductivity measurements for composite MEA's.

| | PBO/PSSA Imbibed | PBO/PSSA Co-processed |
|---|---|---|
| Ratio of N:acid | 1:2 | 1:0.4 |
| Conductivity (S/cm) | $3.33 \times 10^{-5}$ | $9.34 \times 10^{-3}$ |

Although the invention has been described including preferred embodiments thereof and using specific terms, such description is for illustrative purposes only, and it is to be understood that changes and variations may be made by those skilled in the art without departing from the spirit or scope of the invention as set forth in the following claims.

What is claimed is:

1. A solution formed by dilution comprising at least one rigid rod or extended rod lyotropic liquid crystalline polymer and at least one liquid where the solution concentration is greater than about 1.5 percent by weight and less than the as-polymerized concentration of the lyotropic liquid crystalline polymer, wherein the solution is in a nematic phase.

2. The solution of claim 1, wherein the solution concentration is greater than about 1.5% by weight and less than about 90% of the as-polymerized concentration of the lyotropic liquid crystalline polymer.

3. The solution of claim 1, wherein at least a portion of the liquid is a solvent present during polymerization of the rigid rod or extended rod lyotropic liquid crystalline polymer.

4. A homogeneous solution comprising polyphosphoric acid and at least one lyotropic liquid crystalline polymer selected from polybenzoxazole (PBO), polybenzothiazoles (PBZT), and polybenzimidizoles (PBI) wherein the solution is in a nematic phase and comprises between 1.5 weight percent and less than the as-polymerized weight percent of the lytotropic liquid crystalline polymer.

5. The solution of claim 1, wherein the lyotropic liquid crystalline polymer comprises a rigid rod or extended rod polymer according to Formula I or Formula II:

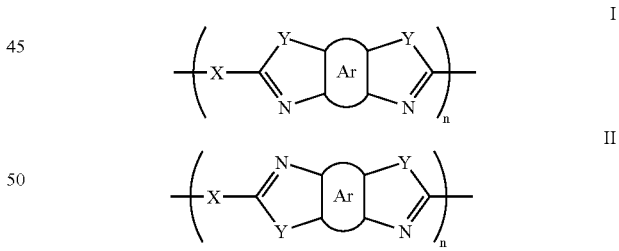

wherein X is selected from aryl and heteroaryl groups and Y is selected from O, S, or NH.

6. The solution of claim 1, wherein the liquid comprises at least one solvent of the lyotropic liquid crystalline polymer.

7. The solution of claim 6, wherein the solvent comprises a strong acid selected from polyphosphoric acid, phosphoric acid, sulfuric acid, fuming sulfuric acid, methane sulfonic acid, trifluoromethane sulfonic acid or a mixture thereof.

8. The solution of claim 1, wherein the solution further comprises at least one additive.

9. The solution of claim 8, wherein the additive is selected from strengthening agents, hardening agents, plasticizers, electroconductive materials, and optical modifiers.

10. A method of preparing a solution of a lyotropic liquid crystalline polymer, wherein the solution comprises between about 1.5 and less than the as-polymerized concentration of the lyotropic liquid crystalline polymer, the method comprising the steps of:
providing an as-polymerized dope solution of the lyotropic liquid crystalline polymer in at least one polymerization solvent; and
introducing a diluent into the as-polymerized dope solution under conditions conducive to formation of a homogeneous lyotropic liquid crystalline polymer solution having between about 1.5 and less than the as-polymerized weight percent liquid crystalline polymer, wherein the conditions permitting the formation of the homogeneous lyotropic polymer solution comprise:
applying a shearing force to the as polymerized dope solution;
degassing the sheared as polymerized homogeneous dope solution; and
applying a shearing force while introducing the diluent into the sheared and degassed as polymerized dope solution.

11. The method of claim 10, wherein the diluent is a solution or dispersion of an additive in the polymerization solvent or a liquid other than polymerization solvent.

12. The solution of claim 11, wherein the additive is selected from strengthening agents, hardening agents, plasticizers, electroconductive materials, and optical modifiers.

13. The method of claim 10, wherein the concentration solution is between 1.5 wt % lyotropic liquid crystalline polymer and about 90% of the as-polymerized concentration of the lyotropic liquid crystalline polymer.

14. The method of claim 10, wherein the lyotropic liquid crystalline polymer is selected from polybenzimidazoles, polybenzoxazoles, and polybenzothiazoles.

15. The method of claim 10, wherein the as-polymerized dope solution is subject to high shear mechanical mixing during the introduction of the diluent.

16. The method of claim 10, wherein the lyotropic liquid crystalline polymer is selected from polybenzimidazoles, polybenzoxazoles, and polybenzothiazoles.

17. The method of claim 10, wherein the lyotropic liquid crystalline polymer is selected from polymers comprising a plurality of repeat units according to Formula I, Formula II, or a mixture thereof:

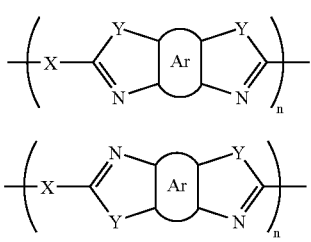

wherein X is selected from aryl and heteroaryl;
and Y is selected from O, S, or NH.

18. The method of claim 10, wherein the resulting homogeneous lyotropic liquid crystalline polymer solution comprises liquid crystalline polymers with substantially similar molecular weights to the liquid crystalline polymers in the as-polymerized dope solution of the lyotropic liquid crystalline polymer.

19. The method of claim 10, wherein the step of applying a shearing force while introducing the diluent is conducted in a vacuum or in the absence of gaseous materials.

20. An article of manufacture having a microporous structure prepared by coagulating at least one solution according to claim 1.

21. The article of manufacture of claim 20, wherein the article is a film or a fiber.

22. An ion conducting membrane comprising an ion conducting material and a microporous film prepared by coagulation of at least one solution according to claim 1.

23. The ion conducting membrane of claim 22, wherein the ion conducting membrane is suitable for use in fuel cells.

24. The solution of claim 4, wherein the solution further comprises at least one additive.

25. The solution of claim 24, wherein the additive is selected from strengthening agents, hardening agents, plasticizers, electroconductive materials, and optical modifiers.

26. An article of manufacture having a microporous structure prepared by coagulating at least one solution according to claim 4.

27. The article of manufacture of claim 26, wherein the article is a film or a fiber.

28. An ion conducting membrane comprising an ion conducting material and a microporous film prepared by coagulation of at least one solution according to claim 4.

29. The ion conducting membrane of claim 28, wherein the ion conducting membrane is suitable for use in fuel cells.

30. A solution formed by dilution comprising at least one rigid rod or extended rod lyotropic liquid crystalline polymer and at least one liquid where the solution concentration is greater than about 1.5 percent by weight and less than the as-polymerized concentration of the lyotropic liquid crystalline polymer, wherein the solution further comprises at least one additive selected from strengthening agents, hardening agents, plasticizers, electroconductive materials, and optical modifiers.

31. A homogeneous solution consisting essentially of polyphosphoric acid and at least one lyotropic liquid crystalline polymer selected from polybenzoxazole (PBO), polybenzothiazoles (PBZT), and polybenzimidizoles (PBI), wherein the solution comprises between 1.5 weight percent and about 8 weight percent of the lytotropic liquid crystalline polymer.

32. A method of preparing a solution of at least one polymer consisting of one or more lyotropic liquid crystalline polymers, wherein the solution comprises between about 1.5 weight percent and about 8 weight percent of the lyotropic liquid crystalline polymer, the method comprising the steps of:
providing an as-polymerized dope solution of the lyotropic liquid crystalline polymer in at least one polymerization solvent; and
introducing a diluent into the as-polymerized dope solution under conditions conducive to formation of a homogeneous lyotropic liquid crystalline polymer solution having between about 1.5 weight percent and about 8 weight percent liquid crystalline polymer.

33. The solution of claim 31, wherein the solution comprises between 1.5 weight percent and about 7 weight percent of the lytotropic liquid crystalline polymer.

34. The solution of claim 31, wherein the solution comprises between 1.5 weight percent and about 3 weight percent of the lytotropic liquid crystalline polymer.

35. The method of claim 32, wherein the solution comprises between 1.5 weight percent and about 7 weight percent of the lytotropic liquid crystalline polymer, and wherein diluent is introduced under conditions conducive to formation of a homogeneous lyotropic liquid crystalline polymer solution having between about 1.5 weight percent and about 7 weight percent liquid crystalline polymer.

36. The method of claim 32, wherein the solution comprises between 1.5 weight percent and about 7 weight percent of the lytotropic liquid crystalline polymer, and wherein diluent is introduced under conditions conducive to formation of a homogeneous lyotropic liquid crystalline polymer solution having between about 1.5 weight percent and about 3 weight percent liquid crystalline polymer.

* * * * *